United States Patent Office 3,306,407
Patented Feb. 28, 1967

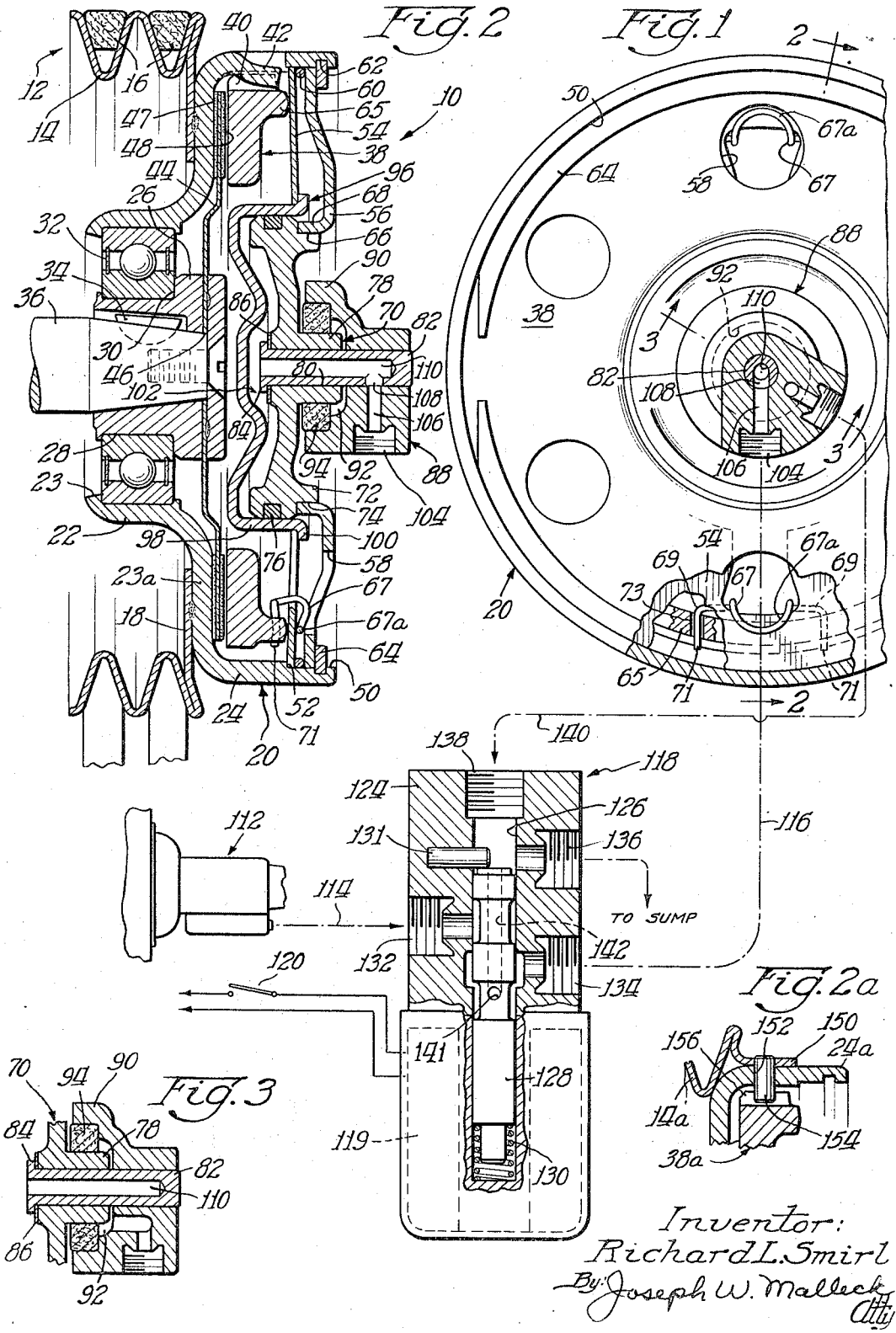

3,306,407
FLUID PRESSURE ENGAGED CLUTCH WITH BELLEVILLE SPRING
Richard L. Smirl, La Grange Park, Ill., assignor to Borg-Warner Corporation, Chicago, Ill., a corporation of Illinois
Filed Dec. 30, 1964, Ser. No. 422,368
2 Claims. (Cl. 192—85)

This invention relates to clutches and more particularly to a clutch for selectively drivingly connecting a vehicle air conditioning compressor to the vehicle engine in response to the heat removal demands of the vehicle passenger compartment.

A primary object of the invention is to provide an improved air conditioner compressor clutch of the hydraulic type which is normally biased to the disengaged position by means of a Belleville spring and which may be selectively engaged by a hydraulic unit including a fixed piston and a movable cylinder, and in which novel means are provided for controlling the actuation to engaged position.

A further object of the invention is to provide a clutch of the stated type wherein a seal is provided to prevent escape of fluid from the cylinder and wherein novel means are provided to prevent a pressure build-up in the seal area.

Another object of the invention is to provide a clutch of the mentioned character wherein novel means are provided to prevent rattling of the Belleville spring.

A further object of the invention is to provide a clutch of the stated type wherein drive is imparted to the air conditioning compressor through the medium of belts and sheaves and wherein novel means are provided for connecting one of the sheaves to the clutch driving element.

A still further object of the invention is to provide a clutch in accordance with the preceding objects which is characterized by convenience in form, facility of manufacture and improved functional characteristics.

This invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIGURE 1 is an elevational view of a clutch system made in accordance with the present invention, said clutch being shown partly in section and with certain portions broken away; the clutch is shown in association with a schematic representation of a fluid control circuit by means of which the clutch of the present invention may be selectively engaged in response to heat removal demands of a vehicle passenger compartment;

FIGURE 2 is a sectional view taken substantially on line 2—2 of FIGURE 1;

FIGURE 2a is a fragmentary sectional view of a modified form of the present invention; and FIGURE 3 is a sectional view taken substantially on line 3—3 of FIGURE 1.

Referring now to the drawing, and more particularly to FIGURES 1 and 2, the clutch of the present invention is illustrated generally by reference numeral 10 and comprises, in this illustrative embodiment, an input member 12 including a double pulley 14 on which are mounted the belt 16 which may be driven by a pulley (not shown) secured to a vehicle engine crankshaft. The pulley 14 has a radially inwardly extending flange 18 secured as by welding or the like, to a drive element 20. The drive element 20 has an axially extending hub section 22 formed with a central opening 23, a radially extending axial flange section 23a and an integrally formed axially extending annular flange section 24. A hub 26 is formed with a reduced diameter portion 28 defining a shoulder 30. On the reduced diameter portion 28 is mounted a ball bearing 32 for journalling the hub 22 of the drive element. The hub 26 may be drivingly secured by a key 34 to a compressor shaft 36.

A pressure plate 38 is disposed within the flange 24 and is formed at its outer periphery with a plurality of circumferentially spaced slots or grooves 40 in each of which is received a tongue 42 struck from the flange 24. By this arrangement, drive is imparted from the element 20 to the pressure plate 38. Arranged between the pressure plate 38 and the radial section 23a of the drive element 20 is a driven plate 44 which has a central opening 46 for reception of the outer end of the compressor shaft 36. On each side of the plate 44 of the outer marginal edge zones thereof are conventional friction facings 47 and 48.

The flange 24 of the drive element 20 has a reduced portion 50 defining a shoulder 52. Mounted in abutment with the shoulder 52 is a Belleville spring 54. An end plate 56 having a plurality of circumferentially spaced openings 58 is positioned with its outer periphery received between an O-ring 60 disposed in the reduced portion 50 and a snap ring 64. O-ring 60 is arranged between the Belleville washer 54 and the plate 56 to assure low friction movement of the Belleville spring in a manner hereafter described. Formed on the inner surface of the reduced portion 50 is a groove 62 for reception of the snap ring 64 for holding the end plate 56 in tight engagement with the O-ring 60.

According to an important feature of the present inveniton the pressure plate 38 is integrally formed with a plurality of circumferentially spaced arcuate lugs 65 forming a fulcrum for the Belleville spring 54 in a manner hereafter apparent, and each forming an anchor for a novel anti-rattler spring 67 shown best in FIGURES 1 and 2. The spring 67 has a central loop section 67a bent into snubbing engagement with the spring 54, outwardly extending leg portions 69 and feet portions 71 each received in an opening 73 in the associated lug 65. It will be apparent that the springs 67 cooperate each with the other to retain the spring 54 in engagement with the lugs 65.

The plate 56 is formed with a central opening 66 having an inwardly directed annular flange 68. A piston 70 is formed with an enlarged rim 72 having a ledge 74 for reception of the flange 68. Preferably, the flange 68 is press fitted into the ledge 74. At the outer periphery of the rim 72 is a groove in which is received a sealing ring 76. At the axis of the piston 70 is formed an axially elongated hub 78 provided with a bore 80 in which is received a pin 82 having at one end a radial flange 84. Positioned between the flange 84 and the left end of the hub 78, as viewed in FIGURE 2, is a sealing washer 86. A fluid distribution housing 88 surrounds the right end of the pin 82 and is formed with an enlarged portion 90 defining a chamber 92. An annular seal 94 is arranged between the enlarged portion 90 and the hub 78 of the piston 70.

A cylinder 96, of a generally cup-shaped configuration, is provided with an annular axially extending flange 98 having at the outer end thereof a radially outwardly extending continuous lip 100. The cylinder 96 defines, in cooperation with the piston 70, a chamber 102. The cylinder 96 is normally urged to the position illustrated by means of the Belleville washer 54 the inner periphery of which abuts against the lip 100. As the chamber 102 is pressurized in a manner hereafter apparent the cylinder 96 is forced to the left, as viewed in FIG. 2, and the spring 54 is pivoted about its outer periphery to urge the pressure plate 38 into engagement with the driven plate 44. It will be noted that the radially inner position of the lugs 65 affords a mechanical advantage. It will be appreciated that the plate 56, the piston 70 and the cylinder 96 normally rotate with the drive element 20.

Referring now to FIG. 2, the fluid distribution housing 88 is formed with a threaded opening 104 in fluid communication with a radial bore 106 which in turn communicates with a radial opening 108 in the pin 82 and an axial bore 110 also in the pin 82. Fluid under pressure may be supplied to the chamber 102 from any suitable source such as an automatic transmission indicated by reference numeral 112 through conduits 114 and 116. This flow of fluid is preferably controlled by means of a solenoid valve 118 having a coil 119 which is selectively energizable by closing of an electrical circuit either by manual switch 120 or a thermostat responsive to passenger compartment heat removal requirements.

The valve 118 has a casing 124 formed with a central bore 126 in which is slidably received a piston or chamber 128. A spring 130 normally biases the plunger 128 to the position illustrated in abutment with a limit pin 131. The casing 124 has a radial inlet port 132 communicating with the conduit 114 and the bore 126, an outlet port 134 affording communication between the bore 126 and the conduit 116, an exhaust port 136 providing communication between the bore 126 and sump and a central threaded counterbore 138 which provides free fluid communication between the chamber 92 to the sump through the medium of a conduit 140, bore 126 and exhaust port 136. This arrangement forms an important part of the present invention and has for its purpose the relieving of fluid pressures which tend to develop in the chamber 92 because of the leakage of fluid along the outer periphery of the pin 82. This pressure would normally tend to result in leakage past the seal 94.

In operation, the clutch 10 may be engaged by energization of the electrical circuit through closing of the switch 120, or other suitable switch, which results in energization of the coil 119 and movement of the plunger 128 from the position illustrated in FIGURE 1 to a position in which free fluid communication is afforded between the automatic transmission 112 and the chamber 102, through conduit 114, port 132, bore 126, port 134, conduit 116, port 104, passage 106, passage 108 and bore 110. When the coil 119 is deenergized, the plunger 128 returns to the position illustrated. In this position, fluid may be exhausted from the chamber 102 through bore 110, passage 108, passage 106, port 104, conduit 116, port 134, bore 126 and a radial passage 141 and central bore 142 formed in the plunger 128, and port 136 to sump. It will be appreciated that drainage of the chamber 92 is at all times affected through the conduit 140.

In FIGURE 2a is illustrated a modified form of the present invention and input sheave 14a is formed with an axially extending annular flange 150 and a drive element flange 24a is formed with a plurality of circumferentially spaced radial openings 152 in each of which is received a pin 154 which extends radially inwardly a sufficient distance to be received in registered openings 156 in the outer periphery of pressure plate 38a. By this arrangement, the pins 154 serve not only to connect the input pulley 14a to drive element flange 24a but also to impart drive to the pressure plate 38a.

The clutch of the present invention exhibits important advantages over clutches of this type heretofore known. For instance, the present clutch has a novel arrangement for relieving undue pressures resulting from shaft leakage. In addition, the anti-rattler spring 67 efficiently and effectively prevents bothersome noise as the Belleville washer 54 is pivoted to force the pressure plate 38a to the left, as viewed in FIGURE 2 to pack the driven member in firm engagement with the flange 23a.

While this invention has been described in connection with one specific embodiment thereof, it is to be understood this is by way of illustration and not by way of limitation and the scope of the invention is defined solely by the appended claims which should be construed as broadly as the prior art will permit.

I claim:
1. A friction device, comprising: a rotative input member having a radial section which carries a cylindrical flange section at the outer periphery of the radial section, rotative output means, and an actuating assembly comprising an end plate nested within said input member and having an annular periphery in engagement with the interior of said cylindrical flange section and adapted to be driven therewith, and an annular pressure plate disposed between said radial section and said end plate having an outer periphery drivingly keyed to said cylindrical flange section, a resilient Belleville diaphragm interposed between said end plate and said pressure plate having an outer periphery fulcrumed on said cylindrical flange section and an inner periphery adapted to be actuated, said diaphragm having an intermediate portion in engagement with said pressure plate effective to urge said pressure plate toward said radial section for promoting clutch engagement with said output means when said inner periphery is actuated, each of said end plate and belleville diaphragm having a centrally aligned opening, a hydraulic means received within said central openings of said end plate and diaphragm and selectively effective to actuate said inner periphery of said diaphragm, said hydraulic means comprising an annular fixed piston carrying an annular shoulder on the outer periphery thereof and effective to receive the inner portion of said end plate to provide a driving connection therebetween, a cylinder having a cylindrical section slidable on said fixed piston and effective to receive the inner periphery of said Belleville diaphragm for movement therewith, and fluid supply means having a passage extending centrally through said piston for actuating said slidable cylinder.

2. A friction device as in claim 1, in which said passage is defined by a supply tube received snugly within a central opening of said fixed piston, said supply tube having an annular radial lip at its inner end contiguous to a flat radial margin of said fixed piston, and an annular flat sealing washer disposed between said marginal radial surface of said piston and the lip of said supply tube for providing a fluid seal therebetween, said release means also comprising a pressure relief passage communicating with the sealed space between said supply tube and fixed piston.

References Cited by the Examiner

UNITED STATES PATENTS

| | | | |
|---|---|---|---|
| 1,612,239 | 12/1926 | Turney | 192—87 |
| 2,120,798 | 6/1938 | Criley | 192—85 |
| 2,246,231 | 6/1941 | Almen | 192—89 X |
| 2,668,610 | 2/1954 | Backus | 192—91 |
| 2,715,343 | 8/1955 | Youngren et al. | 192—85 X |
| 2,835,366 | 5/1958 | Haussermann | 192—89 X |
| 3,130,828 | 4/1964 | Maurice | 192—89 X |
| 3,176,813 | 5/1965 | Lee et al. | 192—85 |

DAVID J. WILLIAMOWSKY, *Primary Examiner.*

BENJAMIN W. WYCHE, *Examiner.*